No. 897,274. PATENTED SEPT. 1, 1908.
W. D. & R. W. DENTON.
BUTTERFLY JEWEL.
APPLICATION FILED SEPT. 18, 1907.

Witnesses
Edwin L. Bradford
H. H. Byron

Inventors
William D. Denton, and
Robert Winsford Denton
By Meyers, Cushman & Rea
Attorney

UNITED STATES PATENT OFFICE.

WILLIAM D. DENTON AND ROBERT WINSFORD DENTON, OF WELLESLEY, MASSACHUSETTS.

BUTTERFLY-JEWEL.

No. 897,274.  Specification of Letters Patent.  Patented Sept. 1, 1908.

Application filed September 18, 1907. Serial No. 393,478.

*To all whom it may concern:*

Be it known that we, WILLIAM D. DENTON and ROBERT WINSFORD DENTON, citizens of the United States, residing at Wellesley, in the county of Norfolk and State of Massachusetts, have invented new and useful Improvements in Butterfly-Jewels, of which the following is a specification.

The present invention relates to improvements in fine arts and has to do with the utilization of the brilliantly colored wings of insects, such as the butterfly and moth.

The invention contemplates the use of regular, geometrical panels or sections of these wings in such manner as that a highly decorative and ornamental effect is produced, and one which simulates closely jeweled effects such as are attained by the use of real jewels in decorative art.

The particular embodiment of our invention herein disclosed is a specific improvement on the invention disclosed in our application Serial No. 303,112, filed February 26, 1906, the embodiment set forth in the present case being designed particularly to give an imitative cameo effect.

In order to secure the best results in practicing the invention it is essential that the identity of the wing be destroyed and that the wing section be so mounted as to heighten the jewel effect, and these results are attained by cutting from the wing a section, preferably of regular outline, and so mounting it as to give a smooth solid appearance to the naturally thin and fragile substance, so that, viewed from any point, an appearance of depth, color, and solidity is produced.

Figure 1:
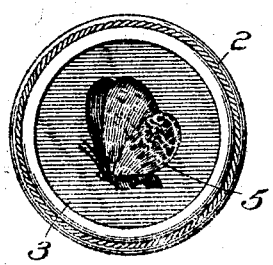
Figure 2:
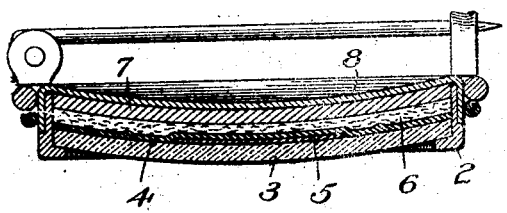
Figure 3:
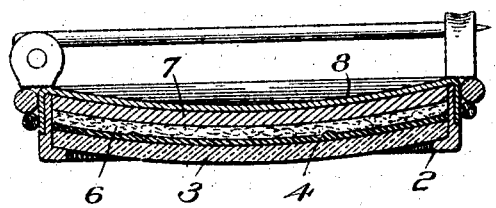

In order that the invention may be clear to those skilled in the art, we have illustrated in the accompanying drawings one embodiment of our invention, the particular illustrative embodiment being in the form of a brooch or pin; and in said drawings:—Figure 1 is a plan view of a brooch embodying the invention. Fig. 2 is a sectional view, enlarged, of the brooch shown in Fig. 1 to illustrate the component elements and the manner in which they are assembled. Fig. 3 is a view similar to Fig. 2, enlarged, illustrating an embodiment of the invention slightly different from, but the equivalent of the form shown in the other views.

Referring to the drawings by numerals, like numbers indicating like or equivalent parts in the several views, 2 designates a frame of any desired design, the embodiment herein being a brooch frame, having a transparent front or panel 3, preferably of glass, and such glass front may, for better effect, be curved so as to present a concavo-convex form in cross-section, but, if desired, the glass front 3 may be in the form of a lens in order to give a magnified effect.

Mounted in the brooch and closely fitting the inner surface of the front 3, is a wing section or panel 4, which is cut to conform to the shape of the brooch, and such section is preferably secured to the front 3 by a suitable cement, although this is not absolutely essential.

In the form shown in Figs. 1 and 2, we mount between the wing section 4 and the front 3, a small butterfly 5, which, as shown, is centrally placed, although it is apparent that its particular position is of no moment so that the resultant cameo effect is produced. The butterfly 5 may be cemented to the wing section 4, or it may be laid thereon and held by pressure from behind, as will now be described. In order that the effect of depth and solidity in the decorative work produced by following our invention may be secured, it is important that a close physical contact between the front 3, the section 4, and butterfly 5, be attained. This is difficult for the reason that the wings of butterflies have veins running through them which are appreciably thicker than the delicate membrane, and if this variation in thickness be not compensated for and taken care of so that a smooth and complete physical contact occurs between the entire wing section and the glass 3, the result is not effective, for the appearance of solidity is destroyed. This is true, also, of the form in which the small butterfly 5 is utilized, for the elements must be in close relation and physically blended, as it were, to give the best results. To secure such result we back the wing section 4 with a layer or filling 6, of yielding material, such as fiber, shredded paper, or any substance which is soft and yielding. This filler 6 when pressed against the wing section 4, forces all parts of the membrane into intimate contact with the under surface of the front 3, and compensates for the vein-thickened portion, and, in the form where the small butterfly 5 is used, it is embedded in the membrane so that a smooth complete contact of the wing section 4 with the glass is secured. Against this filler 6 a stiff backing 7 of any suitable material may be placed, which backing 7 is in turn supported by the back 8 of the brooch, or, if desired, the backing 7 may be omitted and the brooch back 8 may be crowded against the filler 6 to force it into place.

In the form shown in Fig. 3 the construction is identical with that just described, except that the small butterfly 5 shown in the other views is omitted, the other elements being disposed in the same relation as described.

We wish to lay stress on the feature of mounting the section 4, and the butterfly 5 where this is used, beneath the concavo-convex front 3 with which the brooch is provided, although we do not limit ourselves to this, for the reason that by this construction the jewel effect is produced whether the work be viewed from the front or at an angle; for it will be apparent that the imitative colorings and design are pronounced and effective when this curved arrangement is adopted, at whatever angle they may be seen.

While we have shown the backing 4 as formed of a section of a butterfly's wing, it will be understood that the invention may be practiced by utilizing other material which will support and blend or contrast in coloring or design, with the small butterfly; and, furthermore, since the invention has to do with decorative or fine art, we do not limit ourselves to the particular disclosure in connection with a brooch which we have shown; this being merely illustrative of one way of practicing the invention.

Having fully disclosed our invention, we claim:—

1. As a new article of manufacture, an imitation jewel comprising a frame having a glazed front, a section of a butterfly's wing beneath said front to form a background, a natural butterfly interposed between said wing section and said front, a yielding filler beneath said wing section, and a rigid backing to crowd said wing section against and about said interposed butterfly and force them into complete and intimate contact with said front throughout their exposed areas.

2. As a new article of manufacture, imitation jewel comprising a frame having a glazed front of concavo-convex form, a section of a butterfly's wing beneath said front to form a background, a natural butterfly interposed between said wing section and said front, a yielding filler beneath said wing section, and a rigid backing to crowd said wing section against and about said interposed butterfly and force them into complete and intimate contact with said front throughout their exposed areas.

3. That improvement in fine or decorative art, which consists in so mounting a section of an insect's wing beneath a glazed sight opening or panel as to expose a regular definite area, destroy the identity of the wing, and produce a jewel-like effect, superposing on said section a natural butterfly, and forcing the exposed wing area and superposed butterfly into complete and intimate contact throughout its entire surface with said glazed panel to produce an effect of solidity and depth.

4. As a new article of manufacture, an imitation jewel comprising a mounting having a sight opening, a section of an insect's wing so arranged in said mounting as to expose through said sight opening an unbroken definite area of the wing and destroy the identity of the wing as such, and a natural butterfly superposed on said wing section so as to give a cameo like effect.

In testimony whereof we have hereunto set our hands in presence of two subscribing witnesses.

WILLIAM D. DENTON.
ROBERT WINSFORD DENTON.

Witnesses:
  MAY CLIFFORD HURD,
  HATTIE A. DENTON.